United States Patent [19]
Hale et al.

[11] Patent Number: 5,343,382
[45] Date of Patent: Aug. 30, 1994

[54] ADAPTIVE CURRENT CONTROL

[75] Inventors: Edward L. Hale, Carmel; David D. Moller, Kokomo; Robert R. McConnell, West Lafayette, all of Ind.

[73] Assignee: Delco Electronics Corp., Kokomo, Ind.

[21] Appl. No.: 43,086

[22] Filed: Apr. 5, 1993

[51] Int. Cl.$^5$ .................................. H02M 7/5387
[52] U.S. Cl. .................................. 363/98; 363/17; 363/132; 318/599
[58] Field of Search ................. 363/17, 41, 37, 55, 363/56, 58, 98, 132, 136; 318/599

[56] References Cited

U.S. PATENT DOCUMENTS

| | | | |
|---|---|---|---|
| 4,710,686 | 12/1987 | Guzik | 318/293 |
| 4,719,558 | 1/1988 | Hanada et al. | 363/98 |
| 4,777,578 | 10/1988 | Jahns | 363/98 |
| 4,777,579 | 10/1988 | Jahns | 363/98 |
| 4,866,592 | 9/1989 | Fujii et al. | 363/98 |
| 4,935,857 | 6/1990 | Nguyen et al. | 363/17 |
| 4,947,309 | 8/1990 | Jonsson | 363/17 |
| 4,980,838 | 12/1990 | Daggett et al. | 318/599 X |
| 5,047,914 | 9/1991 | Dhyanchand et al. | 363/98 |
| 5,063,338 | 11/1991 | Capel et al. | 318/685 |
| 5,229,929 | 7/1993 | Shimizu et al. | 363/98 |

*Primary Examiner*—Steven L. Stephan
*Assistant Examiner*—Adolf Berhane
*Attorney, Agent, or Firm*—Howard N. Conkey; Mark A. Navarre

[57] ABSTRACT

Closed-loop control of current through a load through pulse-width modulated application of a substantially constant supply voltage across the load, wherein a duty cycle turn-on time is adjusted according to the result of a comparison between a commanded minimum current level and a sensed minimum current through the load during a cycle.

7 Claims, 3 Drawing Sheets

ADAPTIVE CURRENT CONTROL

FIELD OF THE INVENTION

This invention relates to closed loop current control and, more specifically, to an approach for compensating a current driver in response to an actual drive current feedback signal.

BACKGROUND OF THE INVENTION

Closed loop control of the current through an electrical device is well known. A commanded or desired level of current in the device is provided to a current driver and a feedback signal indicative of the actual current in the device is provided from some sensor in privity with the actual current. A controller makes adjustments to the driver control in response to the feedback signal in direction to minimize the difference between the actual and desired current.

Closed loop current controllers may vary in precision and flexibility depending on design constraints. An actual current feedback signal is most critical in control environments in which unpredictable variations in drive voltage or electrical load are expected. An automobile is an example of such an environment, as the demands on the supply voltage from the vehicle battery can vary unpredictably and may affect the regulated battery output voltage. Furthermore, the device being driven in an automobile may be in a harsh environment wherein temperature extremes, moisture and vibration can affect the electrical load of the device.

It is generally known that a desired level of current through a device may be provided by periodically applying a voltage of known magnitude across the device, wherein the periodicity, voltage magnitude, and load characteristics affect the current through the device. A fast acting gate, such as a conventional MOSFET driver may be used to periodically apply the voltage across the device, wherein the MOSFET is pulse width modulated at a duty cycle appropriate for the desired level of current through the device. The driver may be disposed between the supply voltage and the device, a high side driver, between the device and ground, a low side driver, or other, more complicated drive configurations may be provided.

One such configuration is the well-known full H-bridge, wherein a driver is situated above and below each terminal of the device. The advantages of full H-bridges, especially their efficiency and controllability, are well-documented. Pairs of drivers at opposite corners of the bridge conduct to form a path from the supply to ground through the load. One pair conducts to drive current through the device in a first direction and the second pair conducts to drive current through the device in a second direction. Typically, current control through the device via pulse width modulation is provided by allowing the driver between the supply and the device to conduct 100 percent of the time, and pulse width modulating the driver between the device and ground.

When the modulated driver is on, current passes from the supply through the steadily conducting driver, through the device, through the modulated driver, to ground. The current through the device, if it has any significant inductive load, will be charging up at this time. During the time in a cycle when the modulated driver is off, the current will typically be recirculated up to the supply via a flyback diode. The potential across the driven device, from the charging of its inductive load, will discharge according to a generally known schedule as it continues to drive current through the upper portion of the bridge.

Feedback is provided in these drive configurations by interposing a sense resistor in series with the drive circuitry, typically between the drive circuitry or the load and ground. The potential across the sense resistor is communicated to a current controller as an indication of the current through the load. When the modulated driver in a full H-bridge is not conducting, no current passes through the sense resistor, and it therefore cannot inform the controller of the drive current.

Pulse width modulated control of the driver requires an estimation of the driver enable time and driver disable time once per cycle. A common time to turn the modulated driver back on which is when recharging of the device is resumed, is when the current through the device is reduced a predetermined offset below the upper current value. The upper current value is the current level the device must be driven at before the modulated driver will be disabled, as described. The offset, which defines an amount of tolerated current ripple through the device, is typically a narrow range of acceptable driver currents around a desired drive current. The magnitude of the range depends mainly on the control precision required in the application.

The driver turn-off time is conventionally determined directly from the voltage drop across the conducting sense resistor, which may be compared directly to the commanded current level. However, once the driver is turned off, as discussed, no such feedback information is available to the controller. Accordingly, some means of estimation of the proper turn on time must be made.

One approach to estimation of turn on time is modelling the electrical load of the driven device, such as with a parallel combination of a capacitor and resistor. By charging the load and the modelled load contemporaneously, and by monitoring the discharge of the model while both are discharging, the appropriate time to resume charging may be estimated.

This approach is unacceptable in certain applications, such as the above-described automotive applications, in which the device being driven may be subject to a harsh environment which may affect the nature of its electrical load. For instance, if the device operates in an environment subject to significant temperature changes, the rate at which it charges and discharges can vary significantly, due to the temperature dependance of its electrical impedance. Such changes may not be easily reflected in the model thus reducing the accuracy of the model.

The effects of aging and contamination are also difficult to model, and may significantly affect the nature of the device. Accordingly, what is needed is a method and apparatus to accurately estimate the current through the load in a conventional driver configuration when the modulated driver is not conducting.

SUMMARY OF THE INVENTION

The present invention meets the stated need by providing a method and apparatus for precisely estimating the current through a driven electrical load when its modulated driver is not conducting.

More precisely, the present invention monitors the current through the device when the modulated drivers are on, to determine when the drivers should be turned off. Furthermore, an analysis of the current through the device is made when such current is at its minimum level for each cycle. That minimum current is compared to a commanded minimum, and a turn on time adjustment is made that affects the turn on time for subsequent cycles.

The present approach, beyond satisfying the stated need, allows for widely adjustable current ripple magnitude, and provides high precision over a large range of commanded current levels, supply voltage levels, and motor load conditions.

BRIEF DESCRIPTION OF THE DRAWINGS

The invention may be best understood in reference to the preferred embodiment and to the drawings, in which.

DESCRIPTION OF THE PREFERRED EMBODIMENT

Figure 1:
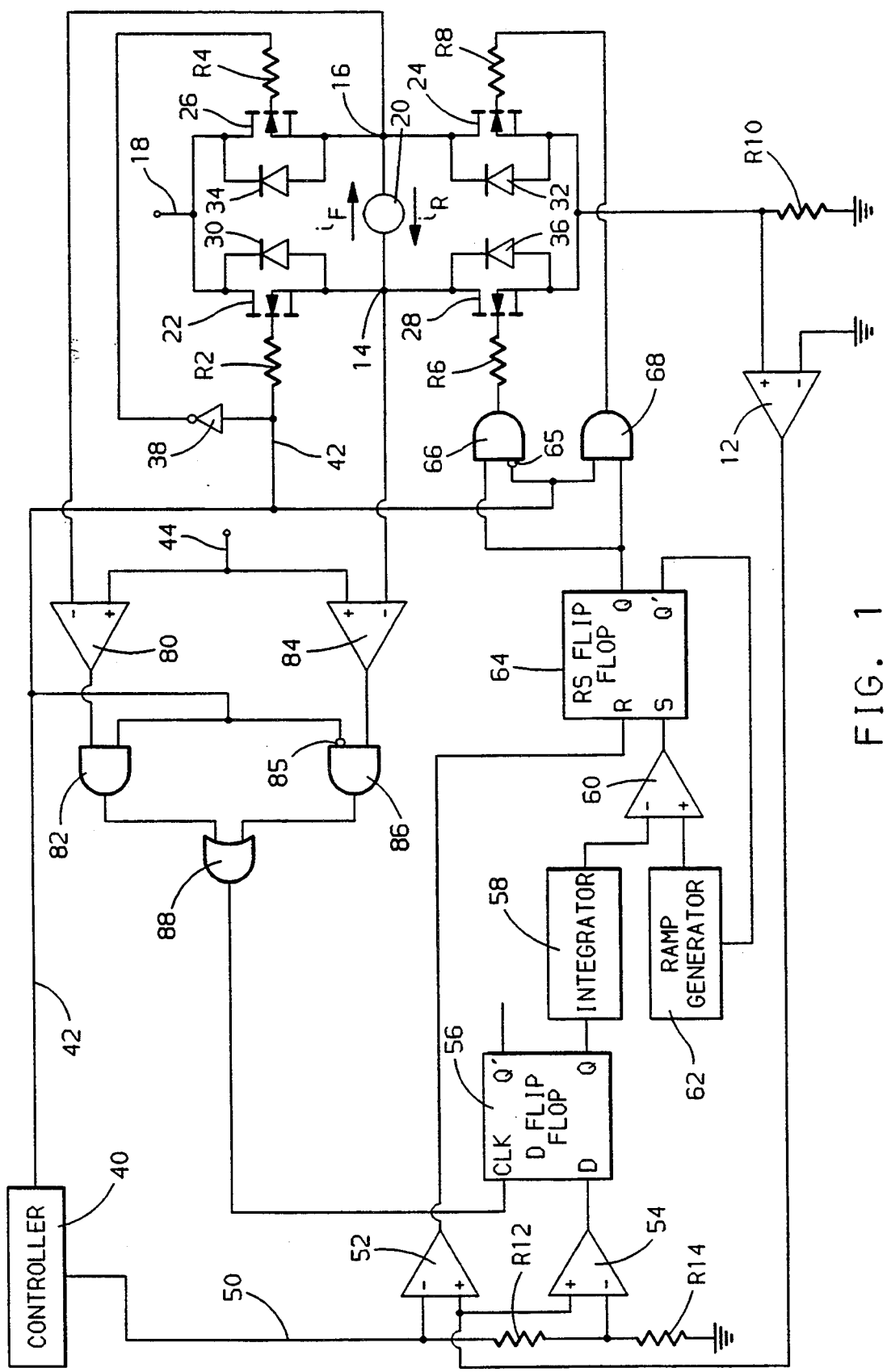
FIG. 1 is a circuit diagram illustrating an interconnection of circuit elements in accord with a preferred embodiment of this invention.

Referring to FIG. 1, a DC motor 20, for instance as applied in antilock brake control in the manner described in U.S. Pat. No. 5,106,171, assigned to the assignee of this application, is driven by n-channel MOSFETs 22-28 in a conventional full H-bridge configuration, including four flyback diodes 30-36 for current recirculation. The high side supply line 18 provides drive voltage to the configuration, at a suitable voltage level for the application, such as approximately twelve volts. The low side of the configuration is shunted to ground through conventional sense resistor R10, set at 0.009 ohms in this embodiment. As is generally known in the art, the voltage drop across the sense resistor R10 is fed back as an indication of current flow through the motor 20.

The voltage across resistor R10 is provided to amplifier 12, which amplifies the voltage measurement by approximately one order of magnitude. The amplified signal is provided to the non-inverting input of comparators 52 and 54. The inverting input of comparator 52 is connected to line 50, on which is provided a desired motor current command, in the form of a voltage level proportional to the desired current level in motor 20.

For instance, the command voltage on line 50 may range from approximately zero to five volts wherein a command of approximately five volts would correspond to maximum motor drive current for the application, a command of approximately zero volts would correspond to minimum drive current, such as zero amps, and intermediate commands would relate proportionately to intermediate desired maximum current values. This command may be output from current controller 40, which may be a conventional microprocessor, which controls the dynamics of motor 20 in accord with the requirements in the application.

The command on line 50 is divided down via conventional voltage divider including resistor R12 and resistor R14. The divided voltage, which is an offset below the commanded voltage on line 50, is input to the inverting input of comparator 54. The extent of the division is related to the amount of current ripple through the motor 20 that will be tolerated in the application. For example, for a given current command in the motor, the current ripple through the motor may be tolerated at one to two percent of the commanded current. In such a case, the voltage level input to the inverting input of comparator 54 should be one to two percent less than the voltage input to the inverting input of comparator 52. This division would be provided by setting R12 to one kilo-ohm, and R14 to 100 kilo-ohms. A minimum current command is thereby defined as the maximum current command on line 50 less the offset.

Generally, the motor 20 will be driven in this embodiment at a constant drive voltage until its current reaches the commanded maximum current on line 50. The drive voltage will then be removed and the current through the motor 20 allowed to decay. The decay will be allowed to continue until, in accord with this embodiment, an estimation is made that the motor current has decayed to the minimum commanded current. When this determination is made, the drive voltage will again be applied across the motor 20 and the process will continue. This comports with a well-known approach to motor control using H-bridge drive configurations, wherein a fixed level drive voltage is applied periodically to the drivers in the bridge with a duty cycle necessary to substantially maintain a desired current level through the motor 20.

Specifically, in the current control approach of the present embodiment of this invention, comparator 52 provides a motor disable signal to the reset input R of RS flip flop 64 when the current feedback signal at its non-inverting terminal exceeds the commanded level at its inverting terminal. The flip flop 64 output Q will be driven low when its reset input R is high.

The output Q is provided as an input to the two-input AND gates 66 and 68. The other input to AND gate 68 is line 42 from controller 40 which is a motor direction command. The direction command is set by the controller 40 in accord with the control requirements of the application. Output line 42 will be high if the commanded motor direction is a first direction, such as forward, and the output line 42 will be low if the commanded motor direction is the opposite direction, such as reverse.

The output on line 42 is applied through inverter 65 to AND gate 66, and is applied in uninverted form to AND gate 68. As such, if the appropriate direction of actuation of motor 20 is forward, the status of output Q of flip flop 64 will be passed through to the output of AND gate 68, and the output of AND gate 66 will be low. Alternatively, if the appropriate direction of motor actuation is reverse, line 42 will be low, the output Q of flip flop 64 will be passed through to the output of AND gate 66 and the output of gate 68 will be zero.

The output of AND gate 66 is passed through resistor R6 of approximately 470 ohms to the gate of n-channel FET 28. Accordingly, current will flow from drain to source of FET 28 when the output of AND gate 66 is high, which is when the output of AND gate 68 is necessarily low. Otherwise, current will not flow through FET 28.

The output of AND gate 68 is connected to the gate of n-channel FET 24 through resistor R8 of approximately 470 ohms in this embodiment. Accordingly, when the output of AND gate 68 is high, which is when the output of AND gate 66 is necessarily low, current will flow from drain to source of FET 24. Otherwise, current will not flow through FET 24.

The pair of FETs 24 and 28 in the full H-bridge configuration of this embodiment are used to control the level of current flow through motor 20 in a conventional manner through pulse width modulation. In accord with this invention, one of these FETs, depending on the appropriate direction of motor actuation, will be on for a duty cycle related to the desired level of current through the motor 20. When motor actuation is required, the appropriate one of these FETS 24 and 28 will be pulse width modulated, and a matching one of the pair of FETS 22 and 26 will be on at 100 percent duty cycle.

Figure 2:
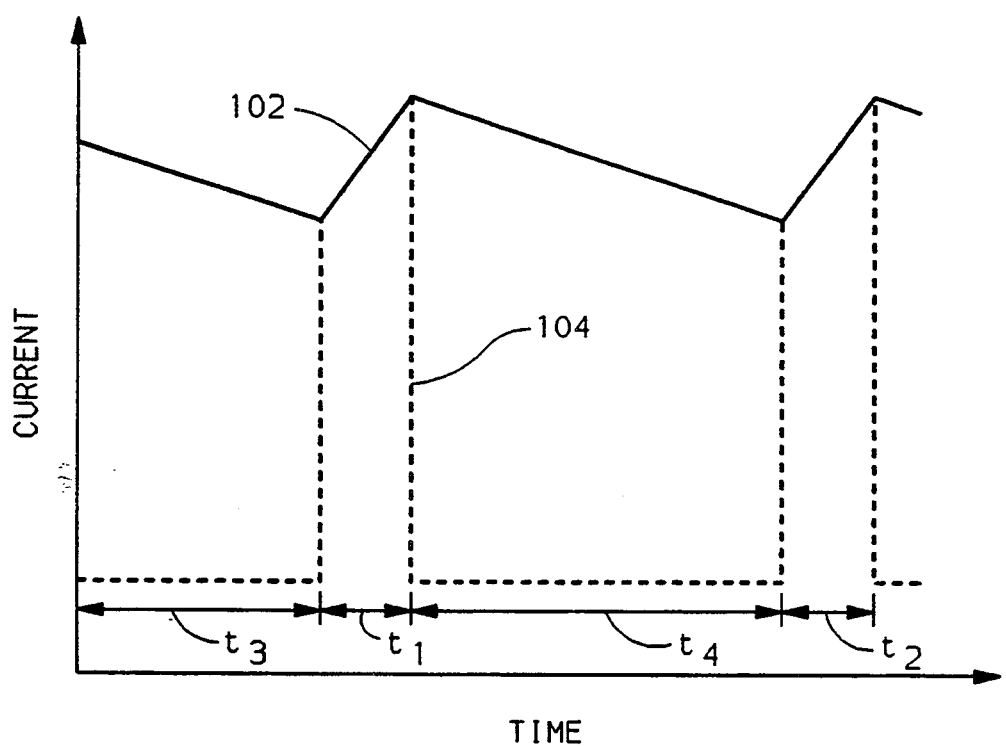
FIGS. 2-4 illustrate representative signal waveforms generated at various stages of the circuit of FIG. 1.

FIG. 2 illustrates a typically current waveform through the motor 20. When the FET to be pulse width modulated is conducting, the supply voltage on line 18 is charging the motor with its inductive and resistive loads, such as at times $t_1$ and $t_2$ in FIG. 2. When the modulated FET is not conducting, the inertia of the inductive load discharges up to supply line 18 via the applicable one of flyback diodes 30 or 34. During this discharge time period, such as the periods $t_3$ and $t_4$ in FIG. 2, the current through the motor 20 is decreasing.

More specifically, in a forward direction of actuation, line 42 will be high, which is passed to the gate of FET 22 through resistor R2 of 470 ohms in this embodiment, allowing n-channel FET 22 to conduct, and allowing FET 24 to be pulse width modulated wherein current will flow through motor in the indicated direction $i_F$, from supply line 18, through FET 22, and through motor 20. During the on-time of FET 24, current will then flow through FET 24 to ground through R10. During the off time of FET 24, current will recirculate through diode 34 to the supply via line 18.

In a reverse direction of motor actuation, line 42 will be low, disabling FET 22. Inverter 38, the input of which is connected to line 42, will output a high signal to the gate of FET 26, through resistor R4, set at 470 ohms in this embodiment. FET 26 will thus conduct at 100 percent duty cycle when the motor 20 is in reverse.

As discussed, FET 28 will be pulse width modulated when the motor is in reverse. Accordingly, current will flow from supply line 18 through FET 26, and through motor 20 in a direction indicated as $i_R$, During the on-time of FET 28, current will flow through the FET 28 to ground through resistor R10. Alternatively, during the off-time of FET 28, current through the motor 20 will recirculate through diode 30 to supply, via line 18.

As is well-established in the art of current control through pulse width modulation, precise control of the level of current in the load, which is the motor 20 in this embodiment, requires precise control of the timing of FET switching. To compensate for changes in supply voltage and in electrical load, the sense resistor R10 has been used to indicate the level of current driven through the motor 20. However, current only flows through sense resistor R10 when the appropriate one of the FETs 24 or 28 is conducting.

When the FETs 24 or 28 are not conducting, no information is available to the current control circuitry from resistor R10 on the level of current at which the motor 20 is being driven. In accord with this invention, circuitry is provided to ascertain appropriate switching time of the FETS 24 and 28 based on the desired drive current from line 50, and based on feedback from the sense resistor R10. An estimation of the current through the motor 20 when the FETs 24 and 28 are not conducting is made available to the control circuitry for more precise current control.

Specifically, comparator 52 issues a FET turn off signal to the FETs 24 and 28 when direct information from sense resistor R10 indicates that current through the motor 20 has increased to substantially the level of the commanded maximum current from line 50, as described. Such an approach comports with conventional practice in closed loop current control with sense resistors. Once the FET 24 or 28 is turned off however, a precise time at which to again turn the appropriate FET on is dictated by dedicated turn on circuitry, including generally comparators 80 and 84, gates 82–88, flip flop 56, integrator 58, comparator 60, ramp generator 62, and flip flop 64.

Specifically, the voltage at node 14 of the H-bridge is provided to the inverting input of comparator 84, and the voltage at node 16 of the H-bridge is provided to the inverting input of comparator 80. The non-inverting inputs of these comparators 80 and 84 are tied to line 44, which is set at a predetermined voltage of approximately two volts in this embodiment. This predetermined voltage should be set a small offset above the sum of the drain to source voltage drop across a conducting conventional n-channel FET of the type used the H-bridge and the voltage across the sense resistor R10 under the maximum expected drive current in the application. This provides, in accord with this invention, an indication of the turn on of the modulated FET, as will be described.

By appropriately setting the voltage on line 44 as described, the output of either of comparators 80 or 84 will switch high when the corresponding one of FETs 24 or 28 is enabled, as the voltage at nodes 14 or 16 will then drop below the voltage on line 44. For example, when driving the motor 20 in the forward direction of actuation by steadily conducting through FET 22 and pulse width modulating FET 24, when FET 24 is conducting, the voltage at node 16 is the sum of the small drop across the small drain to source series resistance of FET 24 and the small drop across resistor R10. The resultant small voltage at node 16 will be less than the appropriately set voltage on line 44, and thus the output of comparator 80, which is provided to an input of AND gate 82, will be low. When FET 24 stops conducting, forming substantially an open circuit between node 16 and resistor R10, the potential at node 16 will rise significantly, increasing well above the voltage on line 44, driving comparator 80 output low. This output will remain low until FET 24 is turned back on, at which time node 16 drops below the voltage on line 44, driving comparator 80 output high.

AND gate 82 output will switch high in the forward direction when FET 24 turns on. This high output is provided as an input to OR gate 88, driving its output high. The other input to OR gate 88 is the output of AND gate 82, which will be low under forward motor actuation, as will be described.

OR gate 88 output is provided as a clock input to conventional D flip flop 56, which is active on the rising edge of its clock input. Accordingly, when gate 24 turns on in the forward direction of motor 20 motion, the flip flop input D, which is the output of comparator 54, will be gated through to the flip flop output. In accord with a critical aspect of this invention, this provides a snapshot comparison of the actual motor current to the commanded minimum motor current when the current through the motor 20 is at a minimum, which is when the FET 24 is turned back on and before any significant charging of the inductive load of the motor 20 has occurred.

The minimum current through the motor 20 must, to minimize current ripple and to maintain a current level through the motor close to the desired current level, not substantially drop below the minimum commanded current level. Accordingly, by providing a comparison of the feedback signal and the desired minimum when the current is at its minimum level, precise control may be provided. For example, if the minimum current is less than the desired minimum, the FET 24 (for the forward direction of actuation) may need to be turned on sooner in the cycle to drive up the motor current, increasing the duty cycle. Alternatively, if the minimum current is greater than the desired minimum, the FET 24 should be turned on later in the cycle as a smaller duty cycle is required to drive the motor at the desired current level.

An analogous analysis of the current feedback signal applies when the motor is being driven in the reverse direction of actuation. In such a case, controller output line 42 will be low, and the drive path of current through the motor 20 will be via FET 26 and FET 28. When FET 28 is conducting, node 14 will be at a low potential, and the output of comparator 84 will thus be high. When the FET 28 is turned off, the output of comparator 84 will be driven low, as the high potential at node 14 will then exceed the appropriately set potential at the non-inverting terminal of comparator 84 from line 44. When the FET is turned back on, the voltage at node 14 will again drop below that on line 44, driving the output of comparator 84 high. Output of comparator 84 is input to AND gate 86. The second input to AND gate 86 is the output of inverter 85 which inverts the motor direction signal on line 42. Under reverse actuation, the output of inverter 85 will be high such that when FET 28 turns back on as described, the output of AND gate 86 will be driven high. This output is provided as an input to OR gate 88. The other input to OR gate 88 is the output of AND gate 86 which will remain low under reverse motor actuation due to the low signal on line 42.

Accordingly, when the output of gate 86 is driven high, the output of OR gate 88 goes high, gating the input D of D flip flop 56 through to its output Q. As described in the forward actuation example, a snapshot comparison of the minimum current through the motor during each cycle of pulse width modulation of FET 28 is thus made by comparator 54 with the minimum commanded current.

For both of the forward and reverse directions of actuation, if the comparison made by comparator 54 indicates that the minimum motor current is below the minimum commanded current, the duty cycle of the control FET, either FET 24 or FET 28 must be increased. Otherwise, the duty cycle must be decreased. Such duty cycle adjustments are substantially provided by the circuit elements 56–64 of FIG. 1. Specifically, the output Q of D flip flop 56 is provided to conventional integrator 58. In this embodiment, a conventional integrator with a time constant of approximately 2 to 3 milliseconds is used. Generally, a suitable time constant for the present embodiment must be substantially longer than the control period within which the one of FETs 24 or 28 are duty cycled. However, the responsiveness of the control, as required in a given application, should be considered as a limit on the magnitude of the time constant.

The integrator output is an integration of its input which, in this embodiment, is the binary output of flip flop 56. In accord with well established principles of signal integration, the integrator output will increase when the flip flop output is high over fifty percent of the time, and the integrator output will decrease when the flip flop output is low over fifty percent of the time. Only when the flip flop is at a fifty percent duty cycle will the integrator output remain substantially constant.

The integrator output is provided to the inverting input of comparator 60. A conventional ramp generator 62 is provided, having an input from the inverted output Q' of RS flip flop 64, and having an output provided to the non-inverting input of comparator 60. The ramp generator 62 ramps its output up from substantially zero volts toward a maximum of approximately five volts at a rate of approximately one volt per fifty microseconds in this embodiment when its input is high, which is when both of the control FETs 24 and 28 are not conducting as the output Q of RS flip flop 64 is low.

When the ramp generator input is low, its output is reset to approximately zero volts. The output of ramp generator is compared to the integrator 58 output via comparator 60. The output of comparator 60 is provided to the set input S of RS flip flop 64. The output Q of RS flip flop 64 will be set when S is high while the reset input R is low. If R is high and S is low, the output Q will be low. Otherwise, the output will not change state.

Figure 3:
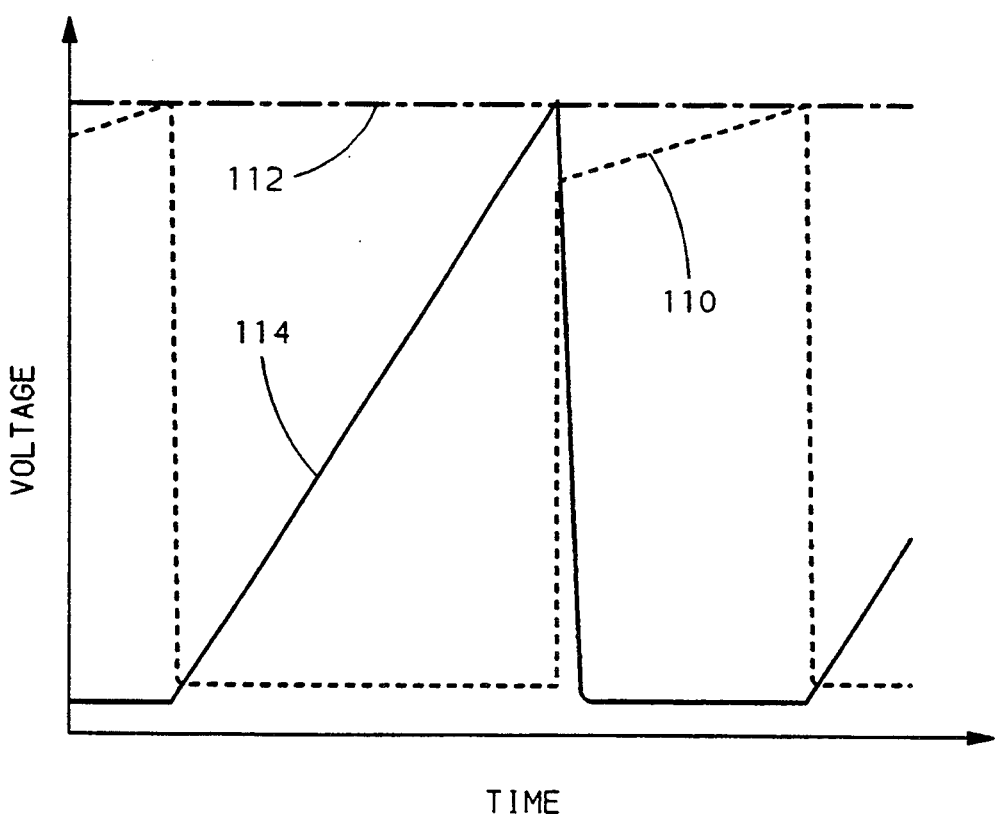

Accordingly, and as illustrated in FIG. 3, the ramp generator output 114 (FIG. 3) increases from approximately zero volts when the active one of the control FETs 24 or 28 is turned off. When the increasing ramp crosses the integrator output 112 (FIG. 3), the set input to flip flop 64 is high, and the flip flop output goes high, turning the applicable control FET back on, charging up the motor current 110 (FIG. 3).

When the applicable FET starts to conduct after being turned on, the output of OR gate 88 will be driven high by elements 80–86, providing another comparison of the minimum motor current and the commanded minimum current, which will provide an appropriate adjustment in the level of integrator 58 for subsequent determinations of FET turn on time, as described. Once turned on, the FET will remain on until the amplified motor current feedback signal input to comparator 52 exceeds the commanded current from line 50, as discussed.

Figure 4:
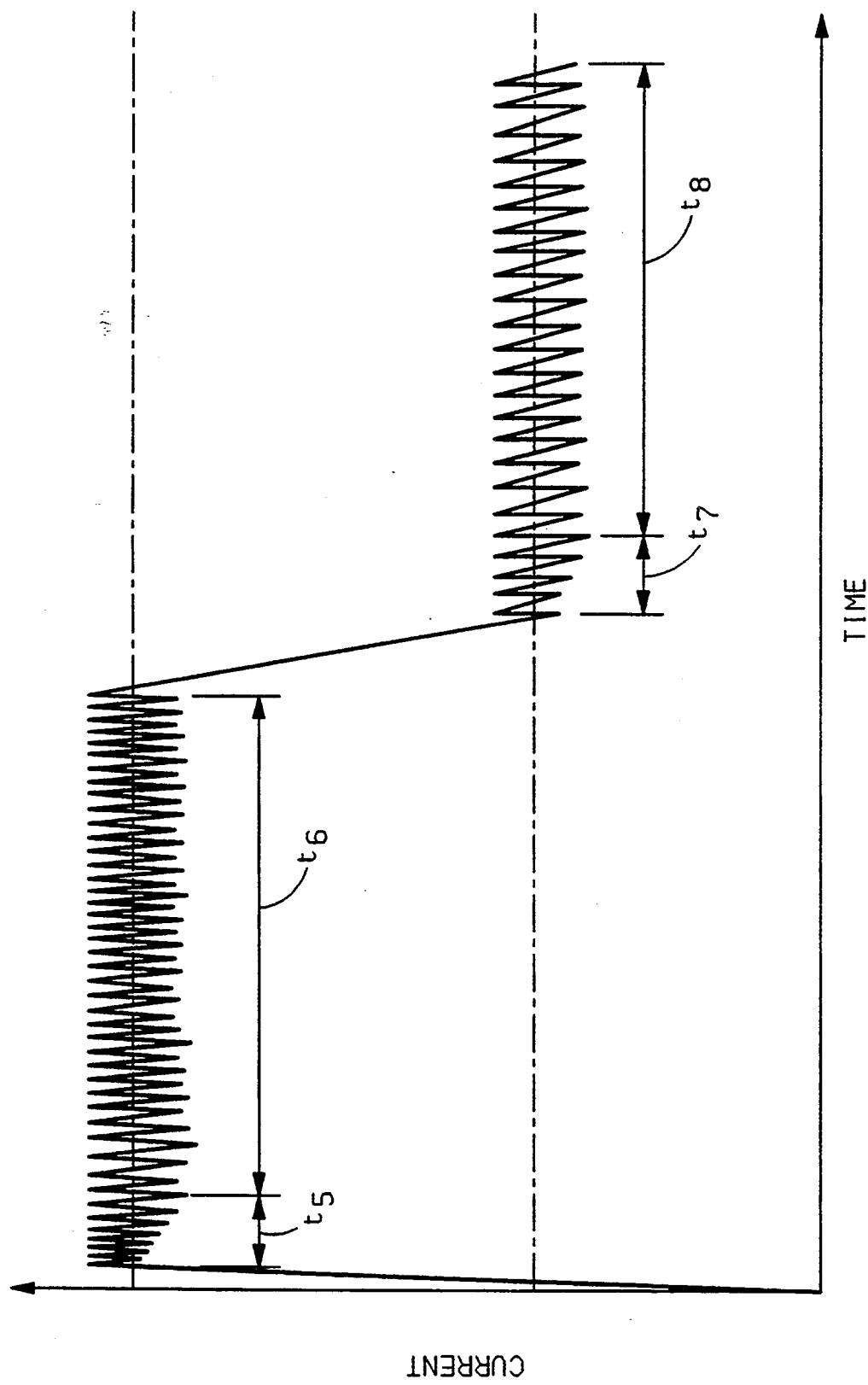

The effect of the above-described current control circuitry is illustrated in FIG. 4 for two commanded levels of current. At the start of time period $t_5$, a new commanded current level is provided from controller 40, via line 50 (FIG. 1). During time period $t_5$, the turn on time is increased for each control cycle, which would appear as an increased integrator 58 (FIG. 1) output. At the end of time $t_5$, the appropriate turn on time has been found, and the circuit has stabilized, as illustrated by the stable turn on time during time $t_6$.

At the end of time $t_6$, a new, lower commanded current level has been issued from controller 40 via line 50 (FIG. 1). The output of comparator 52 remains high, holding the RS flip flop 64 (FIG. 1) reset until just before the start of time $t_7$, which is when the current feedback first is less than the new command, at which time the output of comparator 52 drops low. At the start of time $t_7$, the integrator 58 increases its output to determine an appropriate turn on time for the FET control. At the start time $t_8$ the control has stabilized, as illustrated by the stable turn on time during time $t_8$.

The foregoing description of a preferred embodiment for the purpose of explaining this invention is not intended to limit or restrict the invention since many modification may be made through the exercise of skill in the art without departing from the scope of the invention.

The embodiments of the invention in which a property or privilege is claimed are described as follows:

1. A method for controlling electrical current through a load by repeatedly applying a predetermined voltage across the load for a controlled charge time during which the electrical current passes through a current measuring device, and removing the predetermined voltage from the load for a controlled discharge time during which the electrical current by-passes said current measuring device, comprising the steps of:
   establishing a minimum and a maximum commanded current through the load;
   measuring said electrical current during the charge time using said current measuring device;
   sampling the measured current when it is at a minimum current level during the charge time to provide an estimate of minimum current occurring during the discharge time;
   comparing the sampled current to the minimum commanded current; and
   adjusting a subsequent controlled discharge time in a direction to drive the sampled current toward the minimum commanded current.

2. The method of claim 1, wherein the sampling step further comprises the steps of:
   determining a start time of the controlled charge time; and
   sampling the current through the load at the determined start time.

3. The method of claim 2, wherein the adjusting step further comprises the steps of:
   increasing the duration of the controlled discharge time when the sampled current is greater than the minimum commanded current; and
   decreasing the duration of the controlled discharge time when the sampled current is less than the minimum commanded current.

4. The method of claim 1, further comprising the step of terminating the controlled charge time when the measured current exceeds the maximum commanded current.

5. A method for controlling electrical load current through a load, comprising the steps of:
   establishing a maximum current level and a minimum current level having a predetermined relationship to a desired load current level;
   sensing the load current during a voltage control period during which a voltage is applied across the load and the load current passes through a current sensing device;
   repeatedly (a) terminating the voltage control period when the sensed load current becomes greater than the maximum current level so as to circulate the load current through a circuit path that by-passes said current sensing device and initiate a period of decreasing load current, and (b) initiating the voltage control period after expiration of a controlled duration of the period of decreasing load current;
   sampling the sensed load current upon initiation of the voltage control period to provide an estimate of minimum current occurring during the period of decreasing load current; and
   adjusting a subsequent controlled duration of the period of decreasing load current in a direction to establish the sampled load current at the minimum current level.

6. The method of claim 5, further comprising the step of comparing the sampled sensed load current to the minimum current level, and wherein the adjusting step further comprises the steps of (a) increasing the controlled duration of the period of decreasing load current when the sampled sensed load current is greater than the minimum current level, and (b) decreasing the controlled duration of the period of decreasing load current when the sampled sensed load current is less than the minimum current level.

7. An apparatus for controlling electrical current through a load by repeatedly applying a predetermined voltage across the load for a controlled charge time during which the electrical current passes through a current sensing device, and removing the predetermined voltage from the load for a controlled discharge time during which the electrical current by-passes said current sensing device, comprising:
   maximum current and minimum current command means for commanding a maximum and a minimum current level through the load;
   sampler means for sampling the current passing through said current sensing device when such current is at its minimum level during a controlled charge time, thereby providing an estimate of minimum current occurring during the controlled discharge time;
   comparator means for comparing the sampled current to the commanded minimum current level; and
   means for adjusting a subsequent controlled discharge time in a direction to establish the sampled current at the commanded minimum current level.

* * * * *